(12) United States Patent
Bulan et al.

(10) Patent No.: US 11,380,093 B2
(45) Date of Patent: Jul. 5, 2022

(54) DETECTING ROAD EDGES BY FUSING AERIAL IMAGE AND TELEMETRY EVIDENCES

(71) Applicant: GM Global Technology Operations LLC, Detroit, MI (US)

(72) Inventors: Orhan Bulan, Novi, MI (US); Yehenew G. Mengistu, Sterling Heights, MI (US); Sheetal Mahesh, Austin, TX (US); David H. Clifford, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 48 days.

(21) Appl. No.: 16/943,673

(22) Filed: Jul. 30, 2020

(65) Prior Publication Data

US 2022/0036069 A1 Feb. 3, 2022

(51) Int. Cl.
*G06V 20/10* (2022.01)
*G06T 7/00* (2017.01)
*G06F 17/18* (2006.01)

(52) U.S. Cl.
CPC .......... *G06V 20/182* (2022.01); *G06F 17/18* (2013.01); *G06T 7/0002* (2013.01); *G06T 2207/10032* (2013.01); *G06T 2207/20076* (2013.01); *G06T 2207/20221* (2013.01); *G06T 2207/30256* (2013.01)

(58) Field of Classification Search
CPC .......... G06K 9/00798; G06K 9/0063; G06K 9/00651; G06K 9/6226; G06K 9/6288; G06F 17/18; G06T 7/0002; G06T 2207/10032; G06T 2207/20076; G06T 2207/20221; G06T 2207/30256
See application file for complete search history.

(56) References Cited

U.S. PATENT DOCUMENTS

| | | | |
|---|---|---|---|
| 10,604,156 B2* | 3/2020 | Sorstedt | G01C 21/30 |
| 11,270,131 B2* | 3/2022 | Sugie | G01C 21/32 |
| 2017/0116477 A1* | 4/2017 | Chen | G06K 9/00651 |
| 2019/0244400 A1* | 8/2019 | Hamer | G01C 21/32 |
| 2020/0193157 A1* | 6/2020 | Soni | G06K 9/6261 |
| 2020/0201344 A1* | 6/2020 | Viswanathan | G05D 1/0088 |
| 2020/0201890 A1* | 6/2020 | Viswanathan | G06K 9/00791 |
| 2020/0250438 A1* | 8/2020 | Schachter | G01S 15/931 |
| 2020/0394838 A1* | 12/2020 | Bulan | G06K 9/00798 |
| 2021/0041880 A1* | 2/2021 | Bulan | B60W 40/06 |
| 2021/0088340 A1* | 3/2021 | Bulan | G06T 7/70 |
| 2021/0182575 A1* | 6/2021 | Murakami | G06K 9/4652 |

* cited by examiner

*Primary Examiner* — Ian L Lemieux
(74) *Attorney, Agent, or Firm* — Vivacqua Crane PLLC

(57) ABSTRACT

A method to detect a roadway edge includes calculating a first likelihood of a roadway edge from an aerial image of a roadway by shifting a centerline of the roadway perpendicular to the centerline and overlapping the centerline with image gradients. A second likelihood of the roadway edge is determined using a vehicle telemetry fitting a probability distribution to telemetry points along the roadway. The first likelihood of the roadway edge and the second likelihood of the roadway edge are fused to identify a final likelihood of the roadway edge.

10 Claims, 5 Drawing Sheets

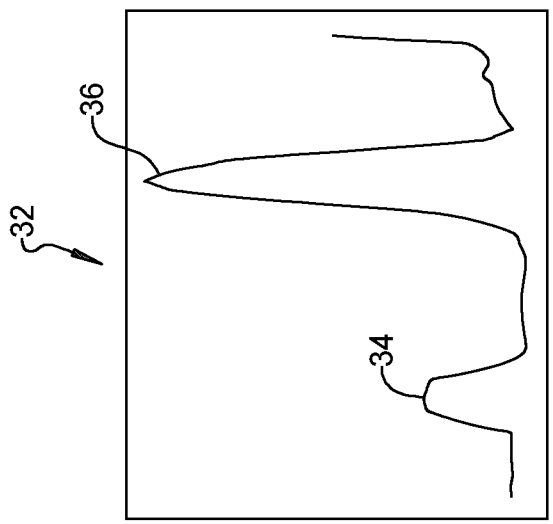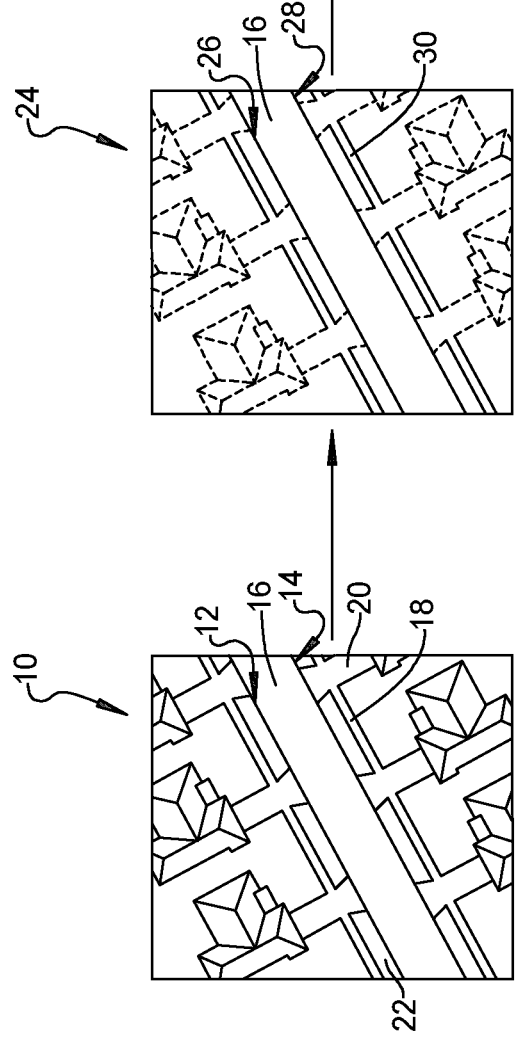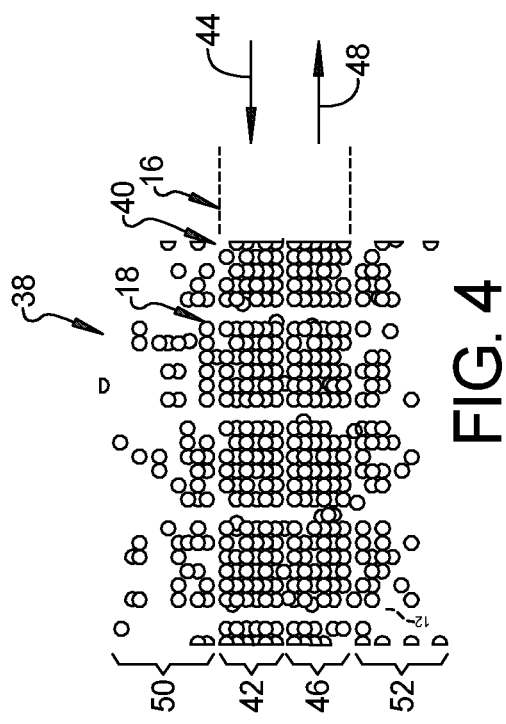

DETECTING ROAD EDGES BY FUSING AERIAL IMAGE AND TELEMETRY EVIDENCES

INTRODUCTION

The present disclosure relates to autonomous vehicle (AV) navigation by detection and collection of road data.

Operation of autonomous vehicles (AV's) requires accurate geolocations of road edges in database maps for AV's to localize and navigate. Precise survey data at sub-meter accuracy using known sensor fusion techniques is lacking for many roads.

Residential roads constitute a significant portion, approximately 30%, of the total roads in North America. Residential roads have minimal and commonly do not have any markings on the road surfaces, therefore AV's may not navigate accurately on residential roads. Known methods to identify road edges and navigational markings may utilize geo-positioning data or cost prohibitive laser guidance systems or may utilize vehicle on-board camera systems to aid in identification of road edges. The number of vehicles having laser guidance equipment or on-board camera systems is still a limiting condition for enablement of broad-based AV operation.

Other known systems estimate a road centerline based on an aggregation of vehicle telemetry data for a quantity of vehicles traversing a roadway segment. Vehicle aggregate data for vehicles traveling in opposite directions on the roadway segment is used to estimate an approximate road centerline, which can be used with road satellite data to approximate a roadway travel lane.

Thus, while current AV identification of road edges and navigational markings achieve the intended purpose, there is a need for a new and improved system and method for detecting road edges for use in AV's.

SUMMARY

According to several aspects, a system to detect a roadway edge includes a first likelihood of a roadway edge calculated from an aerial image of a roadway. A second likelihood of the roadway edge is determined using a vehicle telemetry and a probability distribution fitted to telemetry points along the roadway. A fusion of the first likelihood of the roadway edge and the second likelihood of the roadway edge is used to identify a final likelihood of the roadway edge.

In another aspect of the present disclosure, multiple data points representative of the telemetry points are collected over time from multiple vehicles traveling on the roadway.

In another aspect of the present disclosure, the multiple data points are grouped in multiple groups including a first group representing vehicle travel in a first travel direction.

In another aspect of the present disclosure, the multiple groups include a second group representing vehicle travel in a second travel direction opposite to the first travel direction.

In another aspect of the present disclosure, the roadway includes a centerline, with the first likelihood of the roadway edge calculated by shifting the centerline perpendicular to the centerline and overlapping the aerial image with image gradients; and the first likelihood of the roadway edge is further determined using at least one of: a $95^{th}$ percentile of the data points in the first travel direction determined with respect to the centerline of the first group of the data points; based on a type of the roadway; and a reported quantity of roadway lanes.

In another aspect of the present disclosure, the second likelihood of the roadway edge is further determined using at least one of: a $95^{th}$ percentile of the data points in the second travel direction determined with respect to the centerline of the second group of the data points; based on the type of the roadway; and the reported quantity of roadway lanes.

In another aspect of the present disclosure, an aerial image data map is generated using aerial image data of the roadway.

In another aspect of the present disclosure, multiple data points including at least one object are used to define the roadway edge.

In another aspect of the present disclosure, a graph presents the first likelihood using geolocations identifying the roadway edge.

In another aspect of the present disclosure, the graph presents at least one of: a $95^{th}$ percentile probability of a likelihood of the geolocations of the at least one object, a type of the roadway; and a reported quantity of roadway lanes.

According to several aspects, a method to detect a roadway edge includes: calculating a first likelihood of a roadway edge from an aerial image of a roadway by shifting a centerline of the roadway perpendicular to the centerline and overlapping the centerline with image gradients; determining a second likelihood of the roadway edge using a vehicle telemetry fitting a probability distribution to telemetry points along the roadway; and fusing the first likelihood of the roadway edge and the second likelihood of the roadway edge to identify a final likelihood of the roadway edge.

In another aspect of the present disclosure, the method further includes identifying multiple data points representative of the telemetry points collected over time from multiple vehicles traveling on the roadway.

In another aspect of the present disclosure, the method further includes grouping the data points in multiple groups including a first group representing vehicle travel in a first travel direction, and in a second group representing vehicle travel in a second travel direction opposite to the first travel direction.

In another aspect of the present disclosure, the method further includes determining the second likelihood of the road edge by calculating a $95^{th}$ percentile of the data points in the first data direction with respect to the roadway centerline of the first group of the data points.

In another aspect of the present disclosure, the method further includes determining the second likelihood of the road edge by calculating a $95^{th}$ percentile of the data points in the second data direction with respect to the roadway centerline of the second group of the data points.

In another aspect of the present disclosure, the method further includes: generating an aerial image data map using aerial image data of the area of the roadway; and removing extraneous data from the aerial image data map.

In another aspect of the present disclosure, the method further includes: identifying data points including at least one object defining the roadway edge; and generating a graph presenting the first likelihood using geolocations identifying the roadway edge by presenting $95^{th}$ percentile probabilities of a likelihood of the geolocations of the at least one object.

According to several aspects, a method to detect a roadway edge includes: identifying a centerline of a roadway; calculating a first likelihood of a roadway edge from an aerial image of the roadway by shifting the centerline of the roadway perpendicular to the centerline; determining a second likelihood of the roadway edge using a vehicle telemetry fitting a probability distribution to telemetry points of vehicle telemetry having a first group representing vehicle travel in a first travel direction and a second group representing vehicle travel in a second travel direction opposite to the first direction along the roadway; and fusing a $95^{th}$ percentile of the first likelihood of the roadway edge and a $95^{th}$ percentile of the second likelihood of the roadway edge to identify a final likelihood of the roadway edge.

In another aspect of the present disclosure, the method includes shifting the centerline in predetermined increments of a distance from the centerline.

In another aspect of the present disclosure, the method includes overlapping the centerline with image gradients during calculation of the first likelihood of the roadway edge.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a top plan view of an exemplary roadway section using a system and method for detecting road edges according to an exemplary aspect;

FIG. 2 is a top plan view of an aerial image of FIG. 1 having extraneous data removed;

FIG. 3 is a graph presenting a first likelihood using geolocations identifying a road edge;

FIG. 4 is a graph presenting multiple data points individually representing vehicle telemetry data;

DETAILED DESCRIPTION

Figure 5:
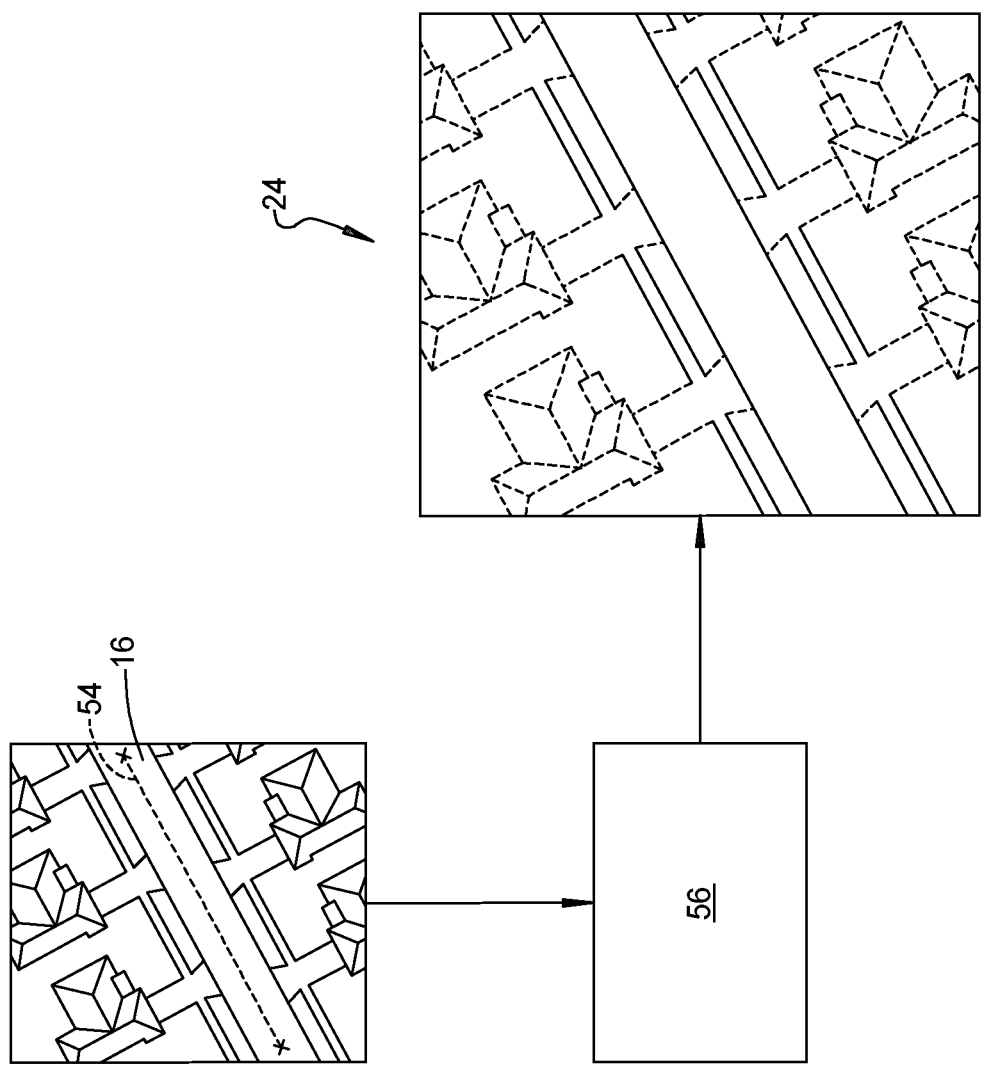
FIG. 5 is a flow diagram showing steps to prepare the aerial image of FIG. 2.

The following description is merely exemplary in nature and is not intended to limit the present disclosure, application, or uses.

Referring to FIG. 1, a system and method for detecting road edges 10 identifies a probability of a location of a first road edge 12 and a probability of a second road edge 14 for a roadway 16. The roadway 16 according to several aspects may traverse areas having a sidewalk 18 on at least one side of the roadway 16, one or more driveways 20 connecting into the roadway 16, and one or more plant or living areas 22 having for example grass or trees along the roadway 16.

Referring to FIG. 2 and again to FIG. 1, in a first method step a data map of an aerial image 24 is generated using aerial image data of the area of the roadway 16. After removal of extraneous data, data points are generated including a first object 26 which represents for example a first likelihood of the first road edge 12, a second object 28 which represents the second road edge 14 and a third object 30 which represents an edge of the sidewalk 18.

Referring to FIG. 3 and again to FIG. 2, after a first calculation a graph 32 is generated presenting the first likelihood using geolocations identifying a probable road edge, presenting $95^{th}$ percentile probabilities of the likelihood of the geolocations of the various objects defined in reference to FIG. 2. The first likelihood of the roadway edge is calculated from an aerial image of the roadway having a centerline of the roadway shifted perpendicular to the centerline as described in greater detail in reference to FIG. 6 and overlapped with image gradients.

In the graph 32 a first peak 34 presents a $95^{th}$ percentile probability of the second object 30 representing a true edge of the roadway 16. A second peak 36 presents a $95^{th}$ percentile probability of the third object 30 representing a true edge of the roadway 16. It is noted in this example the second peak 36 defining the edge of the sidewalk 18 presents a stronger probability of being a true edge of the roadway 16.

Referring to FIG. 4 and again to FIGS. 2 and 3, to enhance the data generated in reference to FIGS. 2 and 3 and to increase the probability of identifying true edges of the roadway 16, a second calculation is performed using vehicle telemetry data to identify a second likelihood of a road edge. The second calculation generates a graph 38 presenting multiple data points individually representing vehicle telemetry data identified as data points 40 collected over time from multiple vehicles traveling on the roadway 16. The telemetry data points 40 represent points at discrete, successive time periods which identify vehicle "poses" each corresponding to a vehicle heading, a vehicle latitude, a vehicle longitude and a vehicle speed. The data points 40 are grouped in several groups including a first group 42 representing vehicle travel in a first travel direction 44, and in a second group 46 representing vehicle travel in a second travel direction 48 opposite to the first travel direction 44. The groups may also include a third group 50 shown outside of the sidewalk 18 and a fourth group 52 which represent vehicle positions outside of the roadway 16, for example vehicle positions in one of the driveways 20.

Referring to FIG. 5 and again to FIGS. 1 through 4, using the group data such as the first group 42 and the second group 46, a roadway centerline 54 is estimated at a midpoint between vehicles traveling in the first travel direction 44 and in the opposite second travel direction 48. The roadway centerline 54 is used for example in a step 56 to identify opposing edges along the roadway direction which assists in elimination of data points outside of the opposing edges, thereby allowing reduction of data points in the aerial image data map 24.

Referring to FIG. 6 and again to FIGS. 1 through 5, according to several aspects the roadway centerline 54 may be used to identify opposing roadway edges as follows. Data present in a first data direction 58 perpendicular to the roadway centerline 54 and data present in a second data direction 60 perpendicular to the roadway centerline 54 and opposite to the first data direction 58 are independently analyzed.

Figure 6:
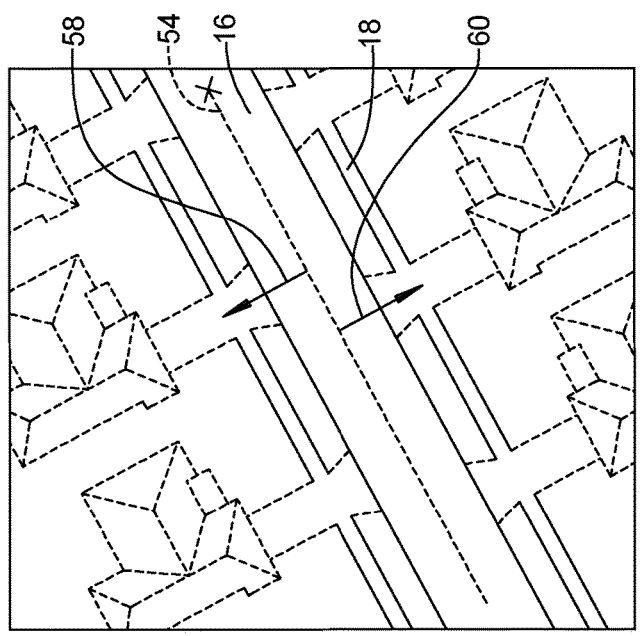
FIG. 6 is an aerial image similar to FIG. 2 presenting roadway centerline displacements.

Referring to FIG. 7 and again to FIG. 6, a graph 62 identifies exemplary image data present in the first data direction 58 shown in FIG. 6 as a function of a distance 64 in 0.2 m increments from the roadway centerline 54. A first data peak 66 having a highest amplitude represents a $95^{th}$ percentile likelihood of a roadway edge corresponding to the first road edge 12. A second data peak 68 having an amplitude lower than the first data peak 66 represents an outer edge of a sidewalk, and a third data peak 70 having an amplitude similar to the second data peak 68 represents an inner edge of the sidewalk.

Figure 7:
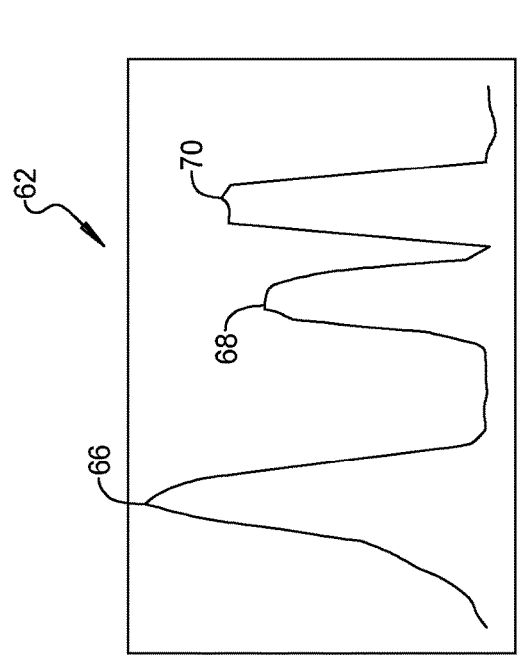
FIG. 7 is a graph presenting image data present in a first data direction shown in FIG. 6.
Figure 8:
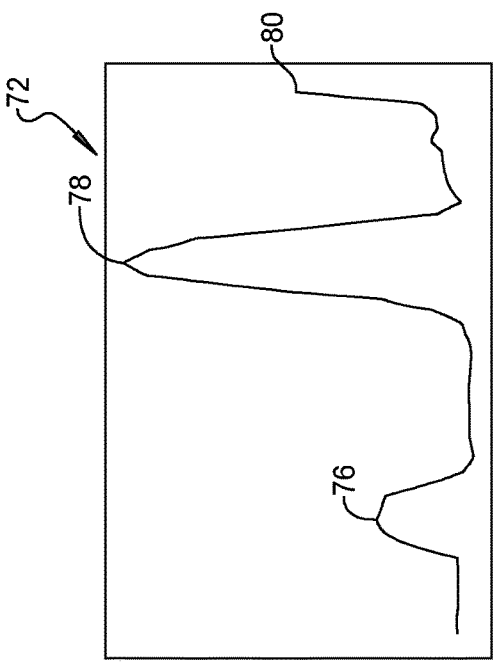
FIG. 8 is a graph presenting image data present in a second data direction shown in FIG. 6.

Referring to FIG. 8 and again to FIGS. 6 and 7, a graph 72 identifies exemplary image data present in the second data direction 60 shown in FIG. 6 as a function of a distance 74 in 0.2 m increments from the roadway centerline 54. A third data peak 76 represents a $95^{th}$ percentile likelihood of a roadway edge corresponding to the second road edge 14. A fourth data peak 78 having an amplitude greater than the third data peak 76 represents an outer edge of the sidewalk 18, and a fifth data peak 80 having an amplitude lower than the fourth data peak 78 represents an inner edge of the sidewalk 18.

Referring to FIG. 9 and again to FIGS. 4 through 6, the likelihood of the road edge defining the first road edge 12 is determined in part based on a calculated $95^{th}$ percentile 82 in the first data direction 58 with respect to the roadway centerline 54 of the first group 42 of the data points 40 representing vehicle travel in the first travel direction 44 and the third group 50 of the data points 40. Similarly, the likelihood of a road edge defining the second road edge 14 is determined in part based on a calculated $95^{th}$ percentile peak 84 in the second data direction 60 with respect to the roadway centerline 54 of the second group 46 of the data points 40 representing vehicle travel in the second travel direction 48 and the fourth group 52 of the data points 40. According to several aspects, the first likelihood of the roadway edge may be further determined using at least one of: the $95^{th}$ percentile of the data points in the first travel direction determined with respect to the centerline of the first group of the data points; based on a type of the roadway; and based on a reported quantity of roadway lanes. According to several aspects, the second likelihood of the roadway edge may be further determined using at least one of: the $95^{th}$ percentile of the data points in the second travel direction determined with respect to the centerline of the second group of the data points; based on the type of the roadway; and based on the reported quantity of roadway lanes.

Figure 9:
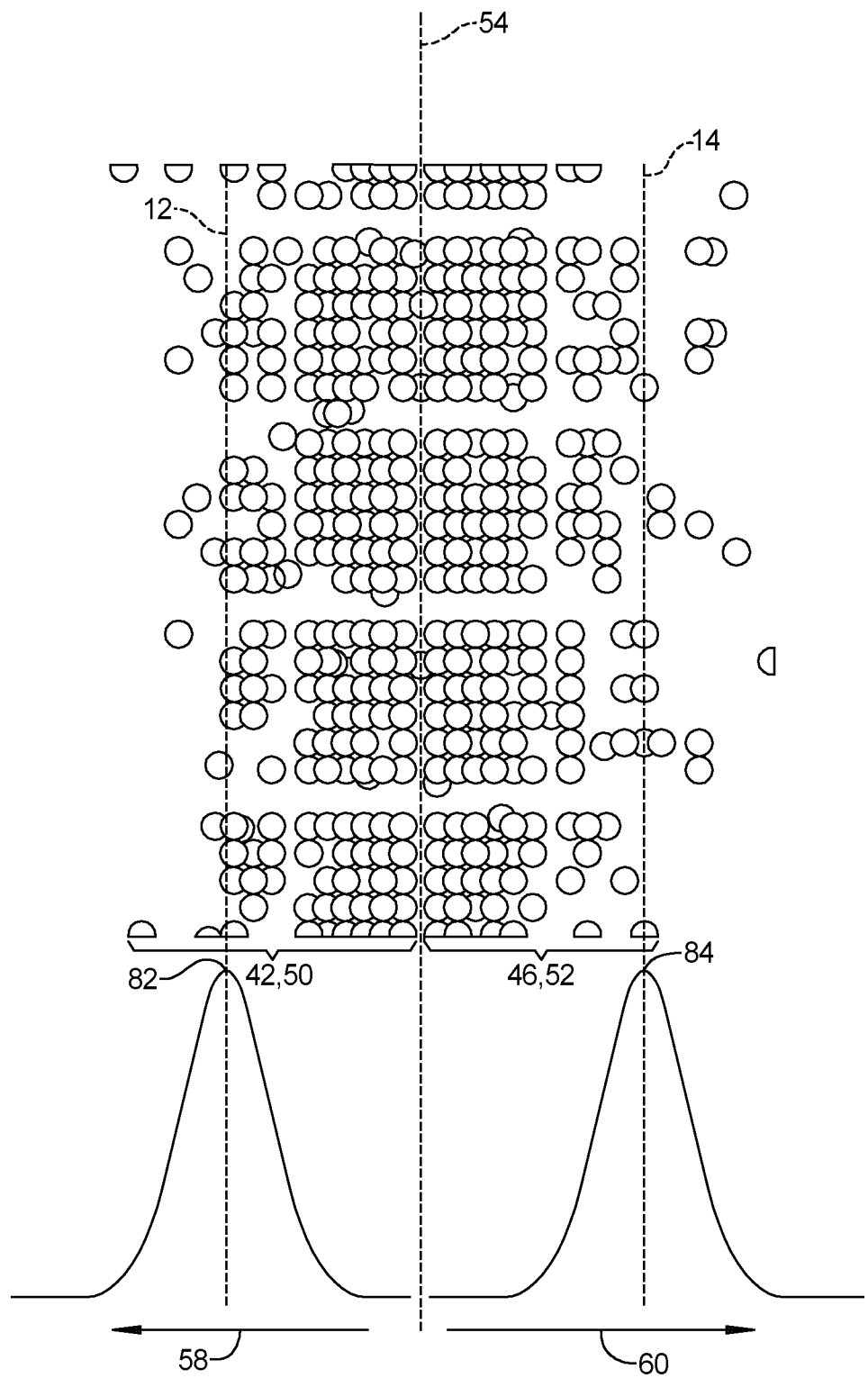
FIG. 9 is a graph modified from FIG. 4 presenting multiple data points individually representing vehicle telemetry data.
Figure 10:
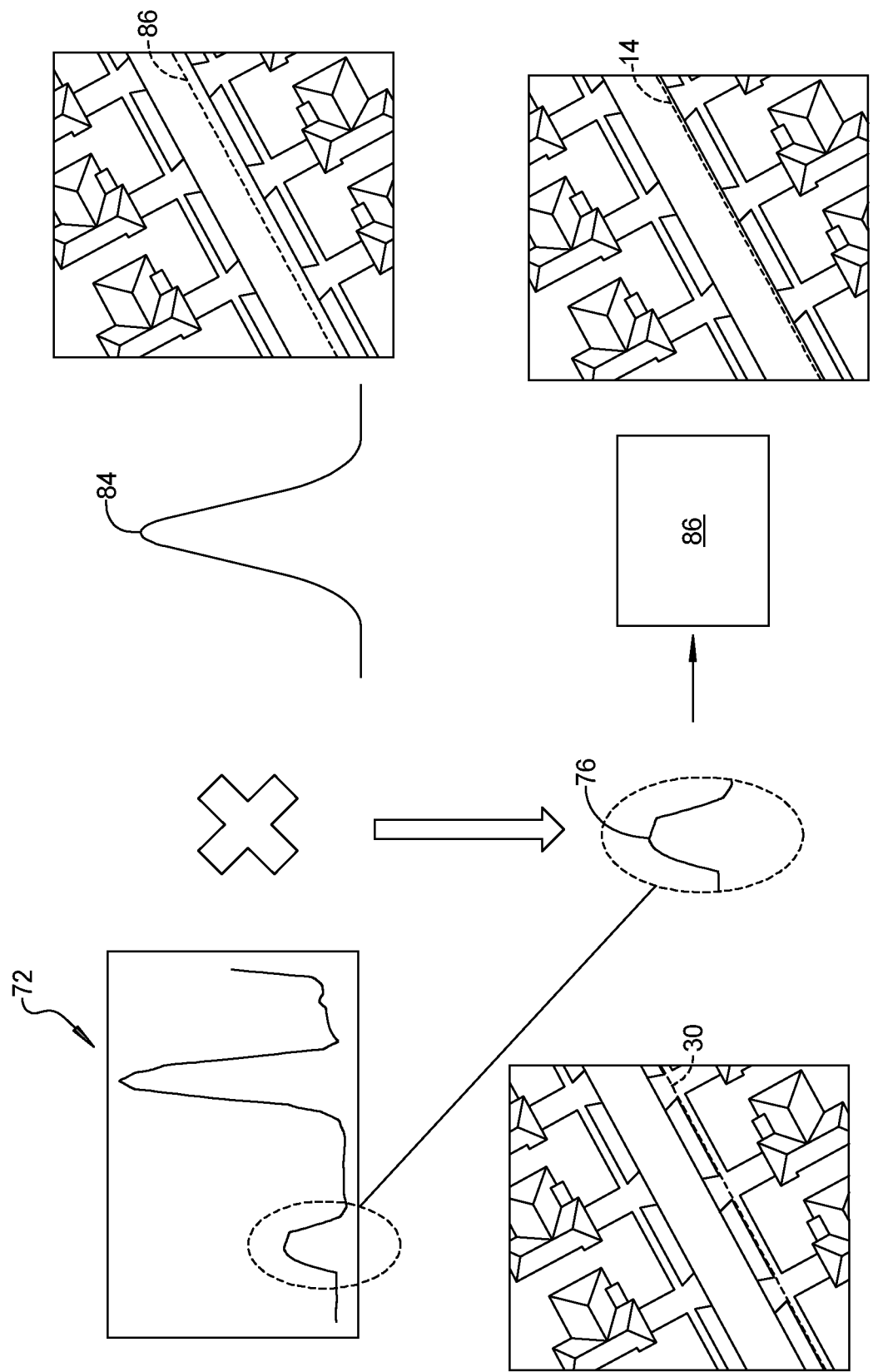
FIG. 10 is a flow diagram showing steps to fuse the data of the aerial image of FIG. 2 with the data from the graph of FIG. 9.

Referring to FIG. 10 and again to FIGS. 1 through 9, to determine a final likelihood of the positions of roadway edges 12 and 14, in a final method step the image evidence determined and identified in reference to FIGS. 1 through 3 and 5 through 8, and the telemetry evidence determined and identified in reference to FIGS. 4 and 9 are fused. For example the graph 72 presenting the edge at the third data peak 76 represents the $95^{th}$ percentile likelihood of the roadway edge at the sidewalk edge 30 and the calculated $95^{th}$ percentile peak 84 in the second data direction 60 with respect to the roadway centerline 54 of the second group 46 of the data points 40 presenting the likelihood of a roadway edge 86, in a fusion step 88, a combined peak fusion of the data of the third data peak 76 and the calculated $95^{th}$ percentile peak 84 is used to determine the $95^{th}$ percentile likelihood of the position of the second road edge 14.

The system and method for detecting road edges of the present disclosure offers several advantages. These include a method for calculating a likelihood for geolocations of roadway edges based on aerial image analysis. These also include a method for calculating a likelihood for geolocations of roadway edges based on analysis of vehicle telemetry. These also include a method for fusing aerial image analysis data and vehicle telemetry data. The present system and method minimizes a need for human labeling for training a neural network for detecting roadway edges for example in residential roads.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method to detect a roadway edge, comprising:
   calculating a first likelihood of a roadway edge from an aerial image of a roadway by shifting a centerline of the roadway perpendicular to the centerline and overlapping the centerline with image gradients;
   determining a second likelihood of the roadway edge using a vehicle telemetry fitting a probability distribution to telemetry points along the roadway; and
   fusing the first likelihood of the roadway edge and the second likelihood of the roadway edge to identify a final likelihood of the roadway edge.

2. The method to detect a roadway edge of claim 1, further comprising identifying multiple data points representative of the telemetry points collected over time from multiple vehicles travelling on the roadway.

3. The method to detect a roadway edge of claim 2, further comprising grouping the data points into multiple groups including a first group representing vehicle travel in a first travel direction, and in a second group representing vehicle travel in a second travel direction opposite to the first travel direction.

4. The method to detect a roadway edge of claim 3, further comprising determining the second likelihood of the roadway edge by calculating a $95^{th}$ percentile of the data points in the first travel direction with respect to the centerline of the first group of the data points.

5. The method to detect a roadway edge of claim 4, further comprising determining the second likelihood of the roadway edge by calculating a $95^{th}$ percentile of the data points in the second travel direction with respect to the centerline of the second group of the data points.

6. The method to detect a roadway edge of claim 1, further comprising:
   generating an aerial image data map using aerial image data of an area of the roadway; and
   removing extraneous data from the aerial image data map.

7. The method to detect a roadway edge of claim 6, further comprising:
   identifying data points including at least one object defining the roadway edge; and
   generating a graph presenting the first likelihood using geolocations identifying the roadway edge by presenting $95^{th}$ percentile probabilities of a likelihood of the geolocations of the at least one object.

8. A method to detect a roadway edge, comprising:
   identifying a centerline of a roadway;
   calculating a first likelihood of a roadway edge from an aerial image of the roadway by shifting the centerline of the roadway perpendicular to the centerline;
   determining a second likelihood of the roadway edge using a vehicle telemetry fitting a probability distribution to telemetry points of vehicle telemetry having a first group representing vehicle travel in a first travel direction and a second group representing vehicle travel in a second travel direction opposite to the first travel direction along the roadway; and fusing a $95^{th}$ percentile of the first likelihood of the roadway edge and a $95^{th}$ percentile of the second likelihood of the roadway edge to identify a final likelihood of the roadway edge.

9. The method to detect a roadway edge of claim 8, further including shifting the centerline in predetermined increments of a distance from the centerline.

10. The method to detect a roadway edge of claim 8, further including overlapping the centerline with image gradients during calculation of the first likelihood of the roadway edge.

* * * * *